United States Patent Office 3,704,137
Patented Nov. 28, 1972

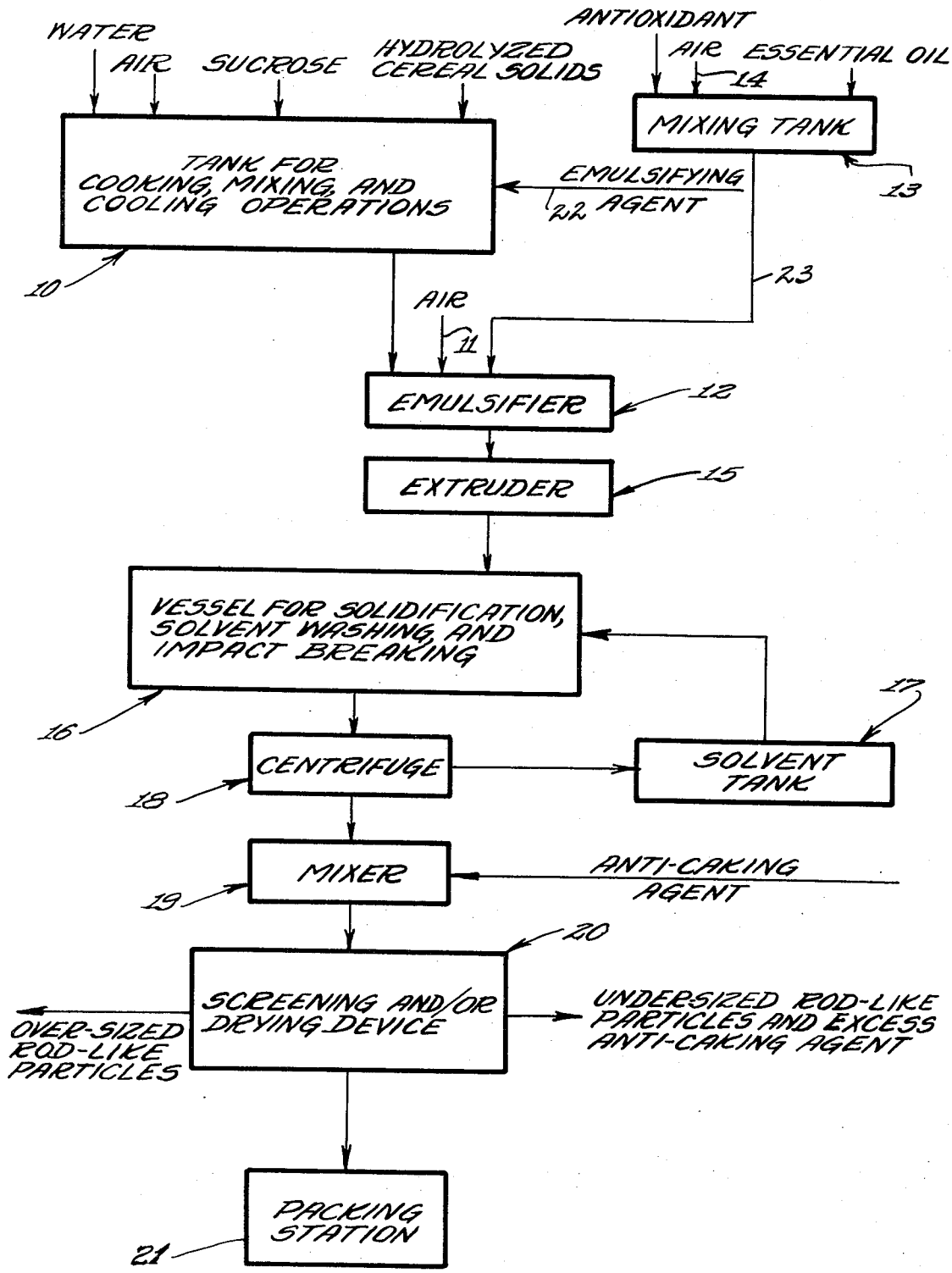

3,704,137
ESSENTIAL OIL COMPOSITION AND METHOD
OF PREPARING THE SAME
Eugene E. Beck, 217½ Ellsworth Ave.,
Anaheim, Calif. 92805
Filed June 11, 1970, Ser. No. 45,287
Int. Cl. A23l 1/22
U.S. Cl. 99—140 R    2 Claims

ABSTRACT OF THE DISCLOSURE

A relatively stable, non-crystallizable essential oil composition in finely divided, rod-like particulate form, and a method of producing such a composition from an aqueous mixture of sucrose, hydrolyzed cereal solids having a dextrose equivalent (DE) of less than about 20, and preferably between 10 and 15, and an emulsifier. An aqueous mixture of the sucrose, hydrolyzed cereal solids and an emulsifier is subjected to agitation and to heating at boiling temperatures until the boiling point of the mixture is at about 122° C. The resulting emulsion is then cooled to about 114° C., while mixing therewith the desired essential oil, either with added emulsifier or with sufficient emulsifier present to form a homogeneous melt. The melt is then extruded into a relatively cool liquid solvent, such as isopropanol, to form the melt into rods and to wash off any excess of essential oil from the surface of said rods. Thereafter, the rods are subjected to centrifugal action to remove the excess liquid solvent. Prior to final drying of the rod-like particles, an inert finely divided silica, such as a pyrogenic silica, is mixed with the broken up rods and the mixture then subjected to screening and final drying to produce a particulate essential oil composition in the form of fine rod-like particles having little or no tendency to stick together due to the admixture of the siliceous inert material. In the final screening and drying steps any overly fine and overly coarse particles of the pyrogenic silica and/or of the particulate essential oil composition are screened out of the product before the same is packed into containers for storage and subsequent use.

SUMMARY OF THE INVENTION

This invention relates particularly to an improvement in a method of preparing essential oil compositions in relatively stable, non-crystallizable, particulate form, having a high content of essential oils for use as solid essential oil flavoring compositions in the preparation of beverage products, including dehydrated compositions containing essential oils and suitable for reconstitution as beverages or for use in the flavoring of pastries and other food products.

One of the novel features of my invention is the use of a hydrolyzed cereal product having a comparatively low dextrose equivalent (DE), substantially below 20 and, in general, between about 10 and 15. Such a hydrolyzed cereal product even when made from corn is not, technically speaking, properly designated as "corn syrup solids," since the latter have a DE of at least 20, and generally considerably higher, with a correspondingly sweet taste, as compared with the bland taste of the hydrolyzed cereal product used in my composition. Such a low DE cereal hydrolysate has itself no tendency to crystallize upon long standing, nor will the addition thereto of sucrose impart to the composition a tendency to crystallize to any objectionable extent. This is in contrast to the crystallizing tendency that sugar would impart to what are properly termed "corn syrup solids," as disclosed, for instance, in the Swisher Pats. Nos. 2,809,895 and 3,041,180.

Another novel feature of my essential oil composition is that it is in a finely divided, rod-like, particulate form, having on the surfaces thereof a powdered siliceous material, such as a pyrogenic silica, to prevent any tendency of the rod-like particles to stick together.

A further object of this invention is to provide a method in accordance with which a homogeneous emulsion, in the form of a melt having a boiling point of about 122° C., comprising sucrose, hydrolyzed cereal solids and an emulsifier, is first cooled to about 114° C. during the mixing therewith of an essential oil, and the resulting melt is then extruded into a relatively cool liquid solvent, such as isopropanol, to form the melt into rods. The isopropanol is kept agitated to break up the rods into the desired lengths and to wash off the exposed oil from the surface of the rods. Subsequently, the rods are subjected to centrifugal action to remove the solvent prior to final drying and screening. Preferably, the finely divided silica is added to the rod-like, particulate mass ahead of the final drying and screening process so that the fines, both of the composition itself and of the siliceous material, are screened out of the final product before packaging thereof.

Other objects, features and advantages of the invention will be readily apparent from the following description of the preferred embodiment thereof, taken in conjunction with the accompanying drawing, although variations and modifications may be effected without departing from the spirit and scope of the novel concepts of the disclosure.

BRIEF DESCRIPTION OF THE DRAWING

The attached sheet of the drawing constitutes a block-type flow diagram of the method of preparing the essential oil composition of my invention.

DETAILED DESCRIPTION OF THE INVENTION

In the drawing, the reference numeral 10 indicates a tank into which water, air, sucrose and hydrolyzed cereal solids are charged. The tank 10 is provided with heating and agitating means to effect the steps of cooking, mixing and cooling. An emulsifying agent is introduced through a line 22 into the tank 10 during the operations carried out therein, at the completion of which the resulting melt is transferred by gravity and/or air pressure and/or pump into an emulsifier tank 12.

In a second flow stream, an essential oil and a suitable anti-oxidant are charged into a closed mixing tank 13. Air introduced under pressure into said tank 13 through a line 14 serves to transfer the resulting mix from said tank 13 with or without a pump included, into an emulsifier tank 12, maintained under air pressure through the line 11.

By way of example, the mixture of material in the tank 10 comprises the following:

400 ml. of distilled water
6840 grams of sucrose (containing about 0.1% moisture)
5160 grams of hydrolyzed cereal solids, 10–13 DE This mixture is agitated in the tank 10 and heated until the boiling point of the mixture reaches 122° C., when heating is stopped. The resulting melt is agitated and 240 grams of an emulsifier, such as a mixture of mono- and di-glycerides of sodium sulfoacetate are introduced through the line 22 into the melt, or any of the other emulsifiers or dispersing agents listed in the Swisher Pat. No. 3,041,180, can be used.

After the melt in the tank 10 has reached a boiling point of about 122° C., thereby lowering the water content to the desired minimum, the heating of the melt is stopped and the melt allowed to flow by gravity and/or air pressure and/or a pump into the emulsifier tank 12.

The amount of essential oil introduced into the mixing tank 13 is 1247 ml., plus a small amount, 0.5% by weight, of an antioxidant such as butylated hydroxyanisole. This is added, at ambient temperature to the melt in the closed emulsifier tank 12 by means of air introduced under pressure into the tank 13 through a line 14 and may be aided with a pump in line 23. The melt and essential oil are intimately mixed under high agitation. The combined mix is continuously forced from the emulsifier tank 12 through the extruder 15 under air pressure and/or a pump. The extruder has a head provided with a large number of about 1/64 inch diameter orifices through which the combined mix is forced under 60 to 100 p.s.i.g. air pressure.

From the extruder 15, the extruded material is discharged into a vessel 16 containing a suitable liquid solvent for the essential oil, such as isopropanol. The liquid solvent is drawn from a tank 17 into the tank 16 at a temperature such as to effect solidification of the extruded melt.

After solidification, the extruded rods are subjected, in the tank 16, to agitation in the isopropanol at about −20° C. to 23° C. to wash off the excess surface oil. The tank 16 also includes a motor driven impeller with blades (not shown) that serve both as an agitator and also to break up the extruded rods to the desired lengths.

From the tank 16, the broken up rods are separated from a major portion of the liquid solvent by a settling or draining action, and the broken up rods are then charged into a centrifuge 18 to remove most of the liquid solvent, the solvent being discharged from the centrifuge into the solvent tank 17.

The particulate, rod-like solids from the centrifuge 18 are discharged into a mixer 19, into which is also charged an anti-caking agent. The preferred anti-caking agent is siliceous material, preferably pyrogenic silica, of a particle size comparable to that desired in the final essential oil composition of my invention.

As shown in the drawing, the anti-caking agent is incorporated into the melt mix prior to drying and screening, but the siliceous material can be added to the liquid solvent prior to extrusion or can be added to the rod-like particles after the centrifuging step in the centrifuge 18.

After mixing of the pyrogenic silica in the mixer 19, drying is accomplished in a screening and/or drying device 20. The drying and screening may be accomplished by the use of screens as the supporting surface during the drying operation.

In the latter case, the rod-like particles are moved over a screen, or preferably a series of successively smaller mesh size screens in the device 20, while at the same time drying of the particles is accomplished either with ambient air or with warm air passed through and/or over the surfaces of the screens.

From the screen-dryer device 20, the undersized rod-like particles and the excess of fine anti-caking agent are discharged through the screens while the oversized rod-like particles are discharged over the ends of the screens. Particle sizing is thus accomplished at the same time as the particles are being dried. The efficiency of the drying operation can be increased by the use of a closed system and a reduced pressure, but, in general, temperatures of not greatly over 100° F. are preferred for use in the drying operation.

From the screens in device 20, the suitably dried and screened essential oil composition is conveyed to a packing station 21.

The finished product contains an amount of essential oil equivalent to about 8 to 10% of oil by weight of the finished product. The product has good keeping properties in that it will not crystallize upon long standing, nor is it subject to substantial deterioration if suitably packaged and protected by antioxidants. The use of about 0.5% by weight of the final composition of pyrogenic silica powder effectively prevents the rod-like particles of the composition from sticking together upon long standing in a packaged condition and, also, of course, facilitates the transfer of the composition from the packages to the points of actual use of the composition.

In place of sucrose, various simple sugars having a desirable sweetening effect, such as dextrose or levulose, may be used. In that case, somewhat lower melt points than those corresponding to a boiling point of about 122° C. will prove satisfactory.

Other antioxidants than butylated hydroxyanisole (BHA), such as butylated hydroxytoluene (BHT) can be used. Also while citrus essential oils, such as orange, are more popular than other essential oils, the composition of my invention includes the use of anise, oil of wintergreen, spearmint oil, and any other relatively volatile, palatable essential oils. The essential oils are present in the final product within the range of from 0.1% to 10% by weight, and preferably from 8 to 10% and not in excess of 12% by weight as a practical maximum.

In order to sweeten the final product, artificial sweeteners such as saccharin can be employed, together with citric or other fruit acid as a supplement for household use.

In place of isopropanol, other liquid solvents, such as ethanol (denatured), may be used to remove the excess essential oil left on the surfaces of the rod-like particles of my essential oil composition. The final product of my invention has the advantage of being non-deliquescent, free-flowing, and stable without crystallizing tendencies over a prolonged shelf life. In general, the rod-like particles are all of about 20 mesh size or finer.

I claim:
1. A method of preparing a relatively stable, particulate essential oil composition, which comprises
   agitating and boiling an aqueous mixture of sucrose,
   hydrolyzed cereal solids having a dextrose equivalent of between about 10 and 15 and an emulsifier until the resulting emulsion is at a boiling point of about 122° C.;
   cooling said emulsion to about 114° C. while mixing therewith an essential oil in a sufficient amount to form a homogeneous melt;
   said amount of essential oil being substantially equivalent to from 8 to 10% by weight of the finished composition;
   extruding said melt into an agitated, relatively cool liquid solvent to form said melt into rods and to break up the rods into desired lengths and also to wash off excess oil exposed on the surfaces of said rods;
   subsequently subjecting said rods to centrifugal action to remove said solvent therefrom;
   prior to final drying of said rods adding to said rods finely divided pyrogenic silica in an amount equivalent to not over about 0.5% by weight of said composition; and
   screening said broken up rods in the presence of said pyrogenic silica and contemporaneously finally drying said rods to produce a particulate essential oil composition substantially free from any tendency to crystallize upon standing.

2. A relatively stable, essential oil composition in particulate form comprising,
rod-like particles of a homogenized emulsion of sucrose and hydrolyzed cereal solids,
said solids having a dextrose equivalent between about 10 and 15,
a selected essential oil in an amount equivalent to about 8 to 10% by weight of the final composition, and
a pyrogenic silica powder associated with said rod-like particles in an amount equivalent to not over about 0.5% by weight of said final composition and effective in tending to prevent sticking together of said particles,
said final composition being substantially free from any tendency to crystallize when standing.

References Cited
UNITED STATES PATENTS

| | | | |
|---|---|---|---|
| 3,505,080 | 4/1970 | Cullen | 99—140 R |
| 3,041,180 | 6/1962 | Swisher | 99—140 |
| 3,560,343 | 2/1971 | Armbruster et al. | 99—142 X |

OTHER REFERENCES

Chemicals Used In Food Processing," Nat'l Acad. of Sciences, Nat'l Res. Council, Publication 1274, Washington, D.C. (1965), p. 269.

MORRIS O. WOLK, Primary Examiner

W. BOVEE, Assistant Examiner